Patented June 10, 1924.

1,497,160

UNITED STATES PATENT OFFICE.

ADOLFO POUCHAIN, OF TURIN, ITALY.

METHOD OF PREVENTING LOSS OF ZINC IN AN ELECTRIC BATTERY.

No Drawing.   Application filed August 18, 1920.  Serial No. 404,452.

*To all whom it may concern:*

Be it known that I, ADOLFO POUCHAIN, a subject of the King of Italy, and resident of Turin, Italy, have invented certain new and useful Methods of Preventing Loss of Zinc in an Electric Battery, of which the following is a specification.

This invention relates to a method of avoiding the attack by the electrolyte of a zinc electrode of an electric battery when the circuit is open.

It is known that loss of zinc when the circuit is open is due essentially to the impurities contained in the zinc used for making the negative electrode, these impurities giving rise to the formation of local couples.

For the purpose of avoiding these losses it has already been proposed to subject the zinc to several treatments, in addition to amalgamation, which tend to make the electrode incapable of attack by the electrolyte when the circuit is open.

For instance, it has been proposed to coat the electrode of zinc with a layer of paste obtained by mixing a fatty substance with a conducting substance, such as mercury or a salt thereof, but such coatings do not give results which are quite satisfactory, either because of their feeble protective action, or because the coating does not last long, or because of difficulties in applying the fatty substance.

By the present invention the zinc may be made completely incapable of attack by the sulphuric acid by covering its surface, after amalgamation, with a layer of fatty substance in a pure condition, that is to say not mixed with a conducting substance.

When a zinc electrode treated in this fashion is used in a battery operated with sulphuric acid, it is found that the battery behaves normally when the circuit is closed and that the electrode is not attacked by the electrolyte when the circuit is open.

For the treatment, a mineral grease is particularly suitable.

The pure fatty substance adheres to the surface of the zinc plate better than when it is mixed with a conducting substance, so that the layer applied to the electrode is not liable to detach itself or to fall away.

In any case the layer of grease may be kept adherent with aid of a grating or a rigid frame, or by enclosing the greased plate in a paper envelope which is itself greased for protecting it from the destructive action of the sulphuric acid.

It is clear that by this invention a treatment of the plate becomes very simple, for it is limited to coating it with a layer of grease as pure as possible, such as it is obtainable in commerce, that is to say without preliminary preparation with another substance which raises the cost of treatment.

What I claim as my invention and desire to secure by United States Letters Patent is:—

1. A method for manufacturing a negative zinc electrode incapable of attack when the circuit is open for use in electric batteries employing liquid electrolyte, said method comprising amalgamating the zinc electrode and then coating it with a layer of consistent pure grease.

2. As a new article of manufacture, a negative electrode for electric batteries with liquid electrolyte, comprising a piece of amalgamated zinc coated with a layer of consistent pure grease.

3. A method for manufacturing a negative zinc electrode incapable of attack when the circuit is open for use in electric batteries employing liquid electrolyte, said method comprising amalgamating the zinc electrode and then applying directly to its surfaces a layer of solid pure grease.

4. As a new article of manufacture, a negative electrode for electric batteries with liquid electrolyte, comprising a piece of amalgamated zinc having applied directly to its surface a layer of solid pure grease.

Signed at Turin, Italy, July 29, 1920.

ADOLFO POUCHAIN.